(12) United States Patent
Franck

(10) Patent No.: US 7,619,811 B2
(45) Date of Patent: Nov. 17, 2009

(54) ZONAL LENSLET ARRAY

(75) Inventor: Jerome B. Franck, Fairfax, VA (US)

(73) Assignee: The United States of America as represented by the Secretary of the Army Pentagon, Washington, DC (US)

( * ) Notice: Subject to any disclaimer, the term of this patent is extended or adjusted under 35 U.S.C. 154(b) by 742 days.

(21) Appl. No.: 10/962,811

(22) Filed: Oct. 7, 2004

(65) Prior Publication Data

US 2006/0078015 A1   Apr. 13, 2006

(51) Int. Cl.
H04B 10/17   (2006.01)
G02B 27/44   (2006.01)

(52) U.S. Cl. ............................ 359/334; 359/565

(58) Field of Classification Search ............ 359/565, 359/334
See application file for complete search history.

(56) References Cited

U.S. PATENT DOCUMENTS

| | | | | |
|---|---|---|---|---|
| 5,369,511 A * | 11/1994 | Amos | ............ | 359/15 |
| 5,684,852 A * | 11/1997 | Tomie | ............ | 378/145 |
| 5,973,844 A * | 10/1999 | Burger | ............ | 359/622 |
| 6,229,562 B1 * | 5/2001 | Kremen | ............ | 348/51 |
| 6,385,228 B1 * | 5/2002 | Dane et al. | ............ | 372/99 |
| 6,511,186 B1 * | 1/2003 | Burstyn et al. | ............ | 353/76 |
| 6,661,558 B2 * | 12/2003 | Toor et al. | ............ | 359/254 |
| 2002/0044345 A1 * | 4/2002 | Takeuchi et al. | ............ | 359/361 |
| 2002/0131175 A1 * | 9/2002 | Yagi et al. | ............ | 359/569 |
| 2003/0123159 A1 * | 7/2003 | Morita et al. | ............ | 359/742 |
| 2004/0085641 A1 * | 5/2004 | Yun et al. | ............ | 359/565 |
| 2004/0090678 A1 * | 5/2004 | Cho et al. | ............ | 359/566 |
| 2005/0046944 A1 * | 3/2005 | Shenderova et al. | ............ | 359/565 |
| 2005/0168820 A1 * | 8/2005 | Yun et al. | ............ | 359/565 |
| 2006/0012772 A1 * | 1/2006 | Sesko | ............ | 356/4.05 |
| 2006/0078016 A1 * | 4/2006 | Franck | ............ | 372/30 |
| 2006/0146897 A1 * | 7/2006 | Franck | ............ | 372/30 |
| 2007/0280626 A1 * | 12/2007 | Haddock et al. | ............ | 385/147 |

OTHER PUBLICATIONS

Pulaski et al. Measurement of aberrations in microlenses using a Shack-Hartmann wavefront sensor. SPIE 2002 4767-07. pp. 1-9. Aug. 8, 2002.*
http://web.archive.org/web/20041027002934/http://www.cvs.rochester.edu/williamslab/r_shackhartmann.html. Sep. 29, 2004.*
Pulaski, Paul. Lenslet Arrays measure aberrations in like devices. Laser Focus World. vol. 38. Issue 12. Dec. 2002.*

* cited by examiner

*Primary Examiner*—Eric Bolda
(74) *Attorney, Agent, or Firm*—John Raubitschek; Richard Kim

(57) ABSTRACT

The invention includes a master lens, which initially focuses a laser pulse, and then the pulse passes through a zonal lenslet array, which uses different lenslet elements that provide for predetermined focal lengths so as to establish a three or two dimensional, predetermined dispersion of foci of the laser pulse. The zonal lenslet array of the present invention may be thought of as a variant of a Shack-Hartman wave front sensor, but used for an entirely different application.

1 Claim, 10 Drawing Sheets

Figure 2
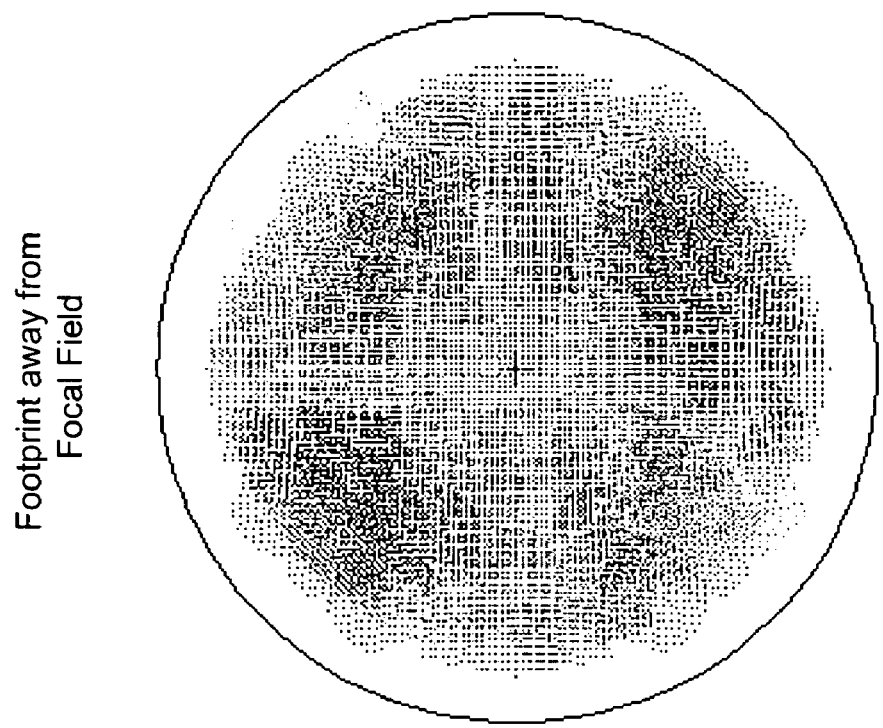
Footprint away from Focal Field
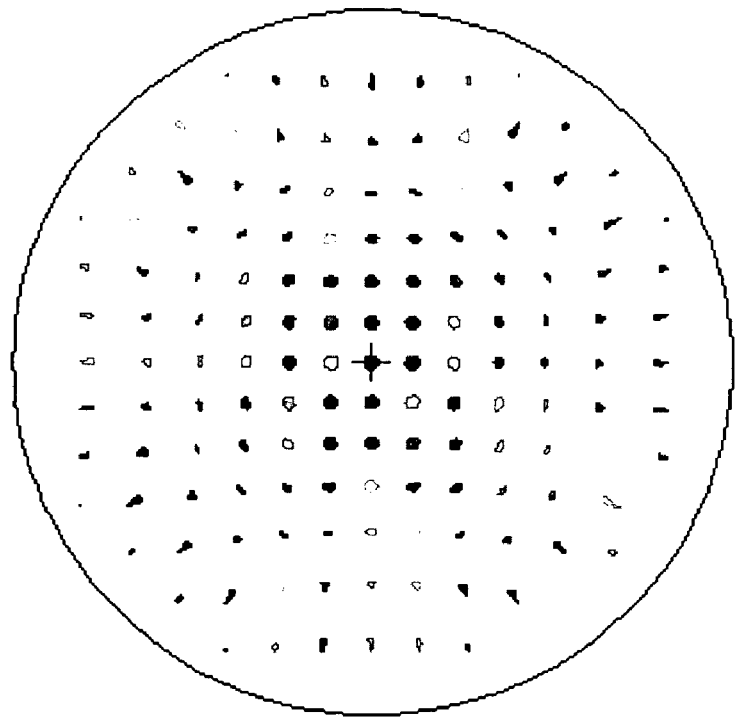
Footprint at Focal Field

ZONAL LENSLET ARRAY

GOVERNMENT INTEREST

The invention described herein may be manufactured, used, sold, imported, and/or licensed by or for the Government of the United States of America.

CROSS-REFERENCE TO RELATED APPLICATIONS

The present application is related to co-pending application, U.S. Ser. No. 10/962,812 filed Oct. 7, 2004 by Jerome B. Franck and entitled, "A Matched Filter Used as an Integral Part of an SBS System for within Cavity Pulse Reconstruction."

FIELD OF INTEREST

This invention relates to lenslet arrays that are useful in lasers applications.

BACKGROUND OF THE INVENTION

Lenslet arrays have been used in many different optical applications such as in telescopy, holography, etc. One particular use of lenslet arrays has been in Shack-Hartman wave front sensors. Most of these lenslet arrays are used to form an image and or receive light and collect it in a particular manner. However, use of lenslet arrays in laser applications has not been disclosed.

Recent discoveries by the inventor have revealed that it would be useful in the laser arts to be able to focus a laser source or sources into several different foci. The present invention addresses this need.

SUMMARY OF THE INVENTION

Accordingly, one object of the present invention is to provide a zonal lenslet array that focuses a laser pulse into several different foci, in particular, one preferred embodiment of the present invention establishes a cone-like dispersion of a laser pulse.

These and other objects of the present invention are achieved by providing for a master lens, which initially focuses a laser pulse, and then the pulse passes through a zonal lenslet array, which uses different lenslet elements that provide for predetermined focal lengths so as to establish a three or two dimensional, predetermined dispersion of foci of the laser pulse. The zonal lenslet array of the present invention may be thought of as a variant of a Shack-Hartman wave front sensor, but used for an entirely different application.

BRIEF DESCRIPTION OF THE DRAWINGS

These and other objects of the invention will become readily apparent in light of the Detailed Description of the Invention and the attached drawings wherein:

FIG. 2 shows 2 different footprints established by the present invention as it focuses the input laser signal. The one on the left shows the foci at the focal field and the one on the right shows the dispersion away from the focal field.

DETAILED DESCRIPTION OF THE INVENTION

Figure 1:
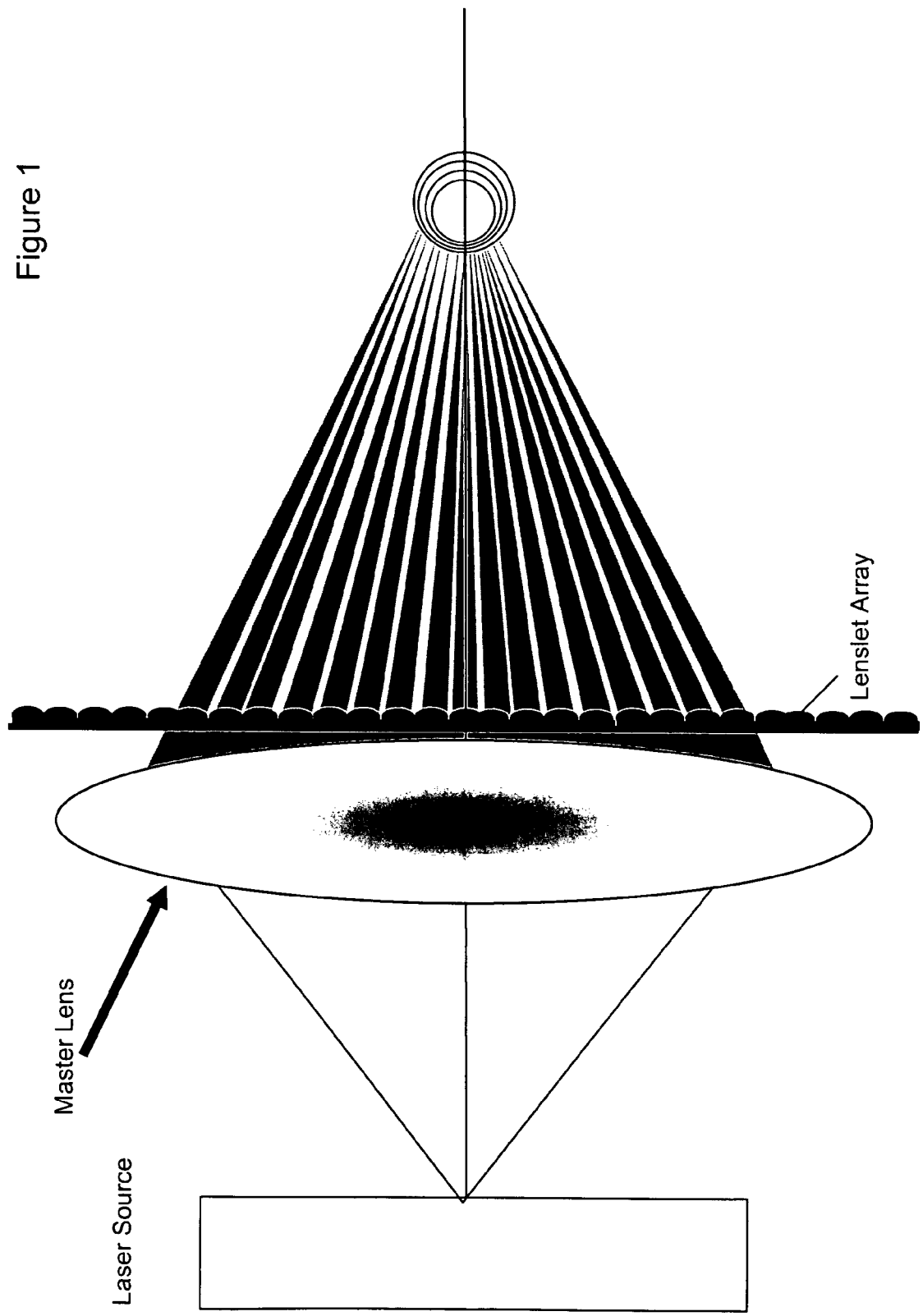
FIG. 1 shows a profile of a uniform array of lenslet elements where are the lenslets have the same optical power.

As shown in cross-section in FIG. 1, the present invention includes a laser source that produces a laser pulse. The laser pulse and laser source can take many forms, but it is anticipated that the present invention will have particular use in short wave laser and high power laser applications. Given this disclosure, those skilled in the art will be readily able to engineer any number of laser applications using the lenslet array of the present invention. The base of the present invention is a lenslet array that uses a plurality of lenslets that are arranged to provide for predetermined focal lengths so as to establish a three or two dimensional, predetermined dispersion of foci of the laser pulse. Disposed between the lenslet array and the laser pulse will normally be a master lens, which will initially focuses the laser pulse on the lenslet array. However, this master lens is not necessary for all applications.

FIG. 2 shows 2 different footprints established by the present invention as it focuses the input laser pulse at several different foci. The one on the left shows the foci at the focal field region. This shows the separation of the multitude foci at a predetermined length away from the lenslet array. This shows a relatively flat focal length for the dispersion. However, the focal lengths of each of the lenslets in the array to create any number of two dimensional (as shown) or three dimensional focal patterns. The Figure on the right shows the dispersion of the input laser signal away from the focal field. These aspects will be more apparent looking at the further figures.

Figure 3:
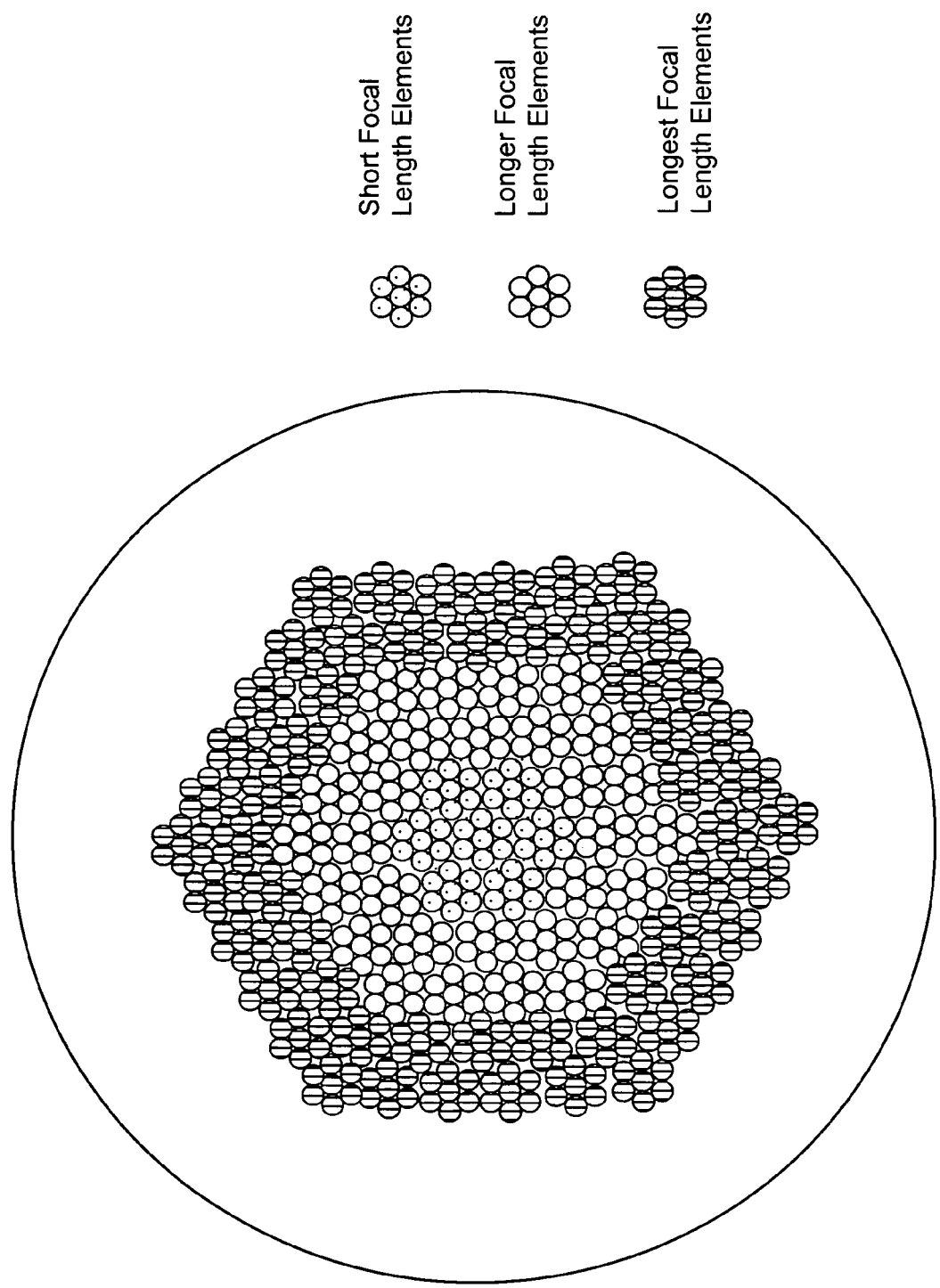
FIG. 3 shows the dispersion of lenslets in the zonal lenslet array of the present invention.

FIG. 3 shows an example of a dispersion of lenslets in the zonal lenslet array according to the present invention. As is shown, one configuration of the present invention uses concentric rings outlying one another where the largest ring has the longest focal length, the middle ring has a shorter focal length and the inner most circle has the shortest focal length.

Figure 4:
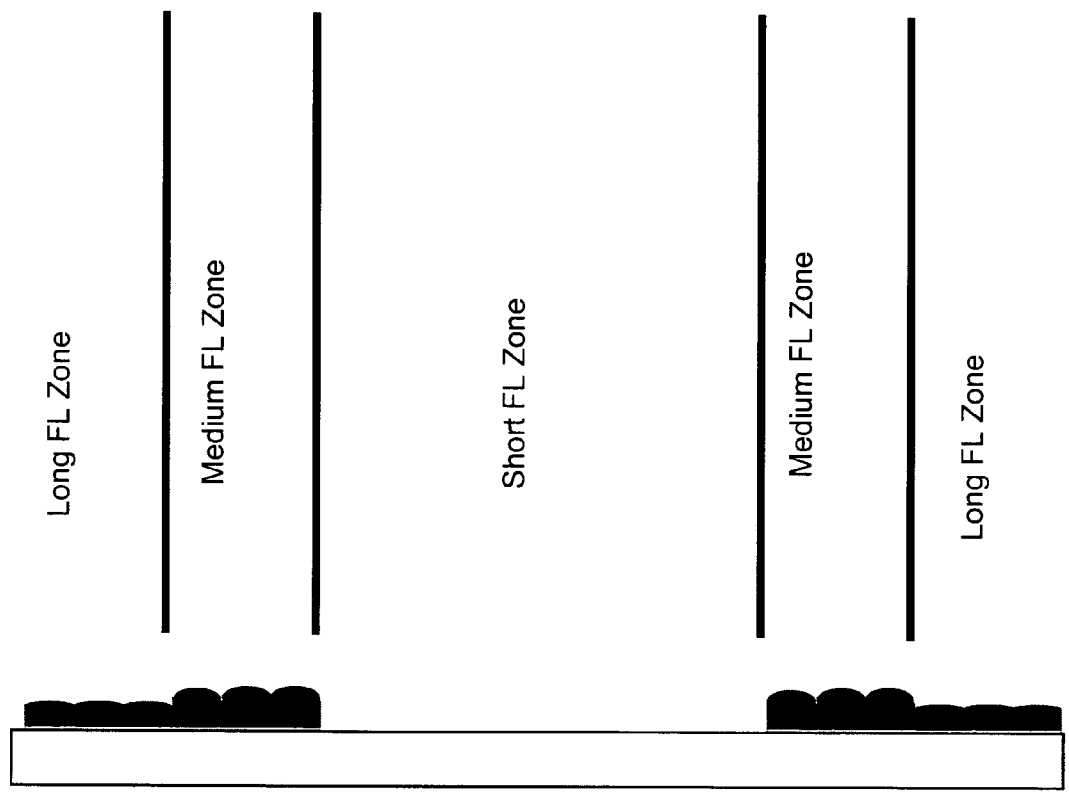
FIG. 4 is cross section view of the dispersion of lenslet elements in the zonal lenslet array of the present invention.

FIG. 4 shows this same configuration in cross section wherein the view of the dispersion of lenslets in the zonal lenslet array gets longer the further they are from the center of the array.

Figure 5:
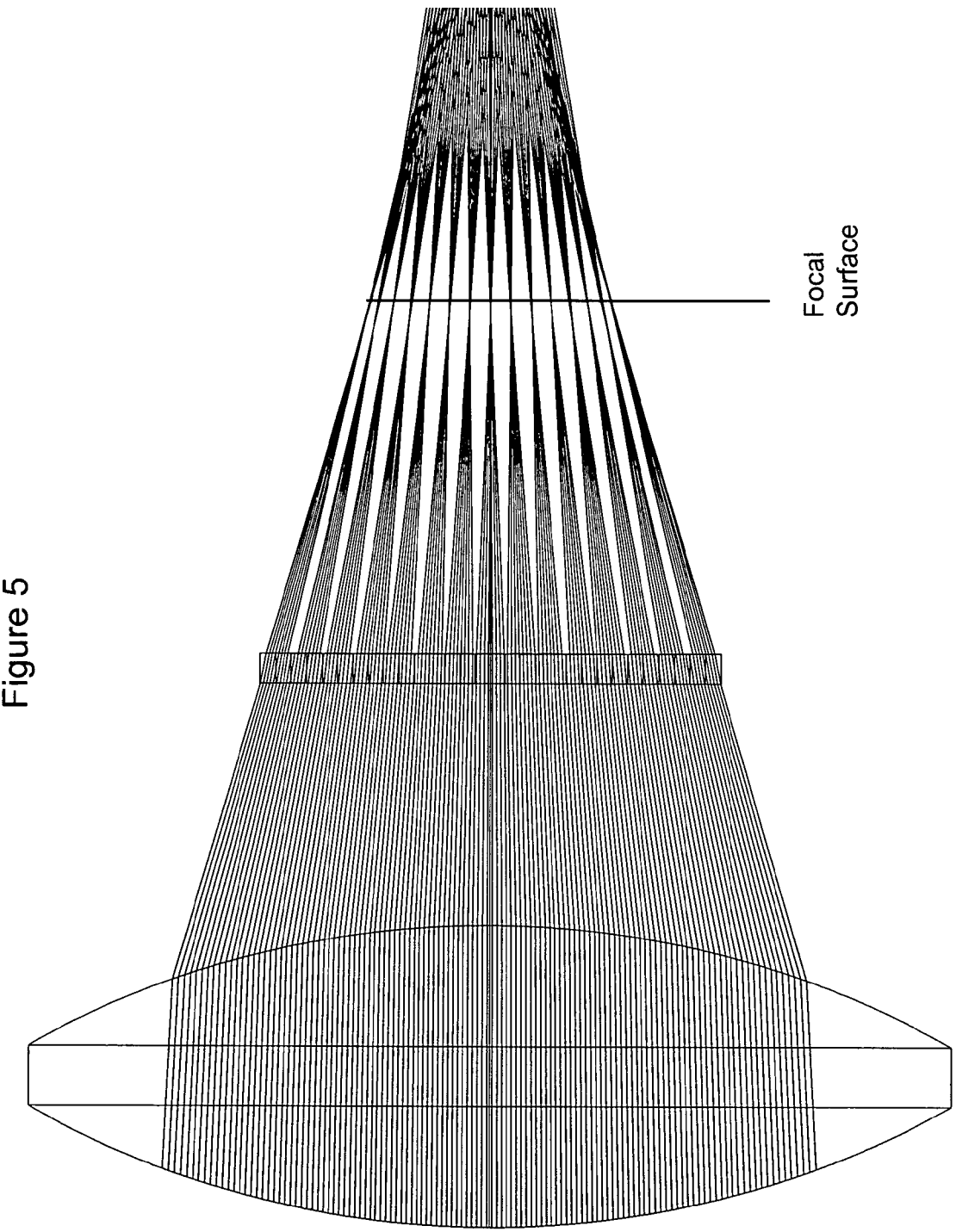
FIG. 5 shows how the lenslets of the present invention may be arranged to form a flat focal area of several focal points.

FIG. 5 shows how the lenslets of the present invention may be arranged to form a dispersion of several focal points that are all equidistant from the lenslet array. This shows, in cross-section, a view of the lenslet array configuration shown in FIG. 2.

Figure 6:
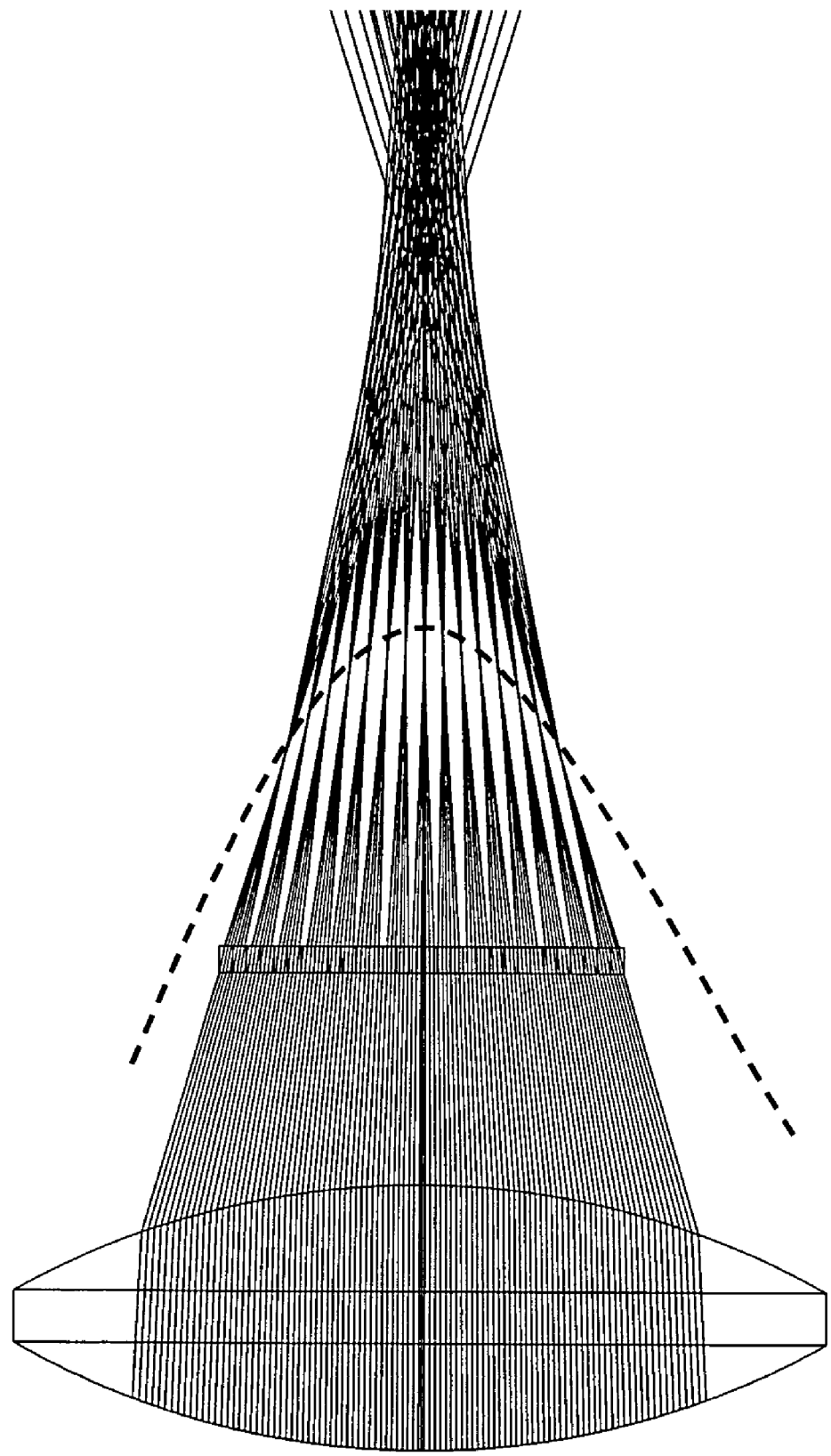
FIGS. 6 and 7 show different configurations of the lenslet elements that form different focal fields.
Figure 7:
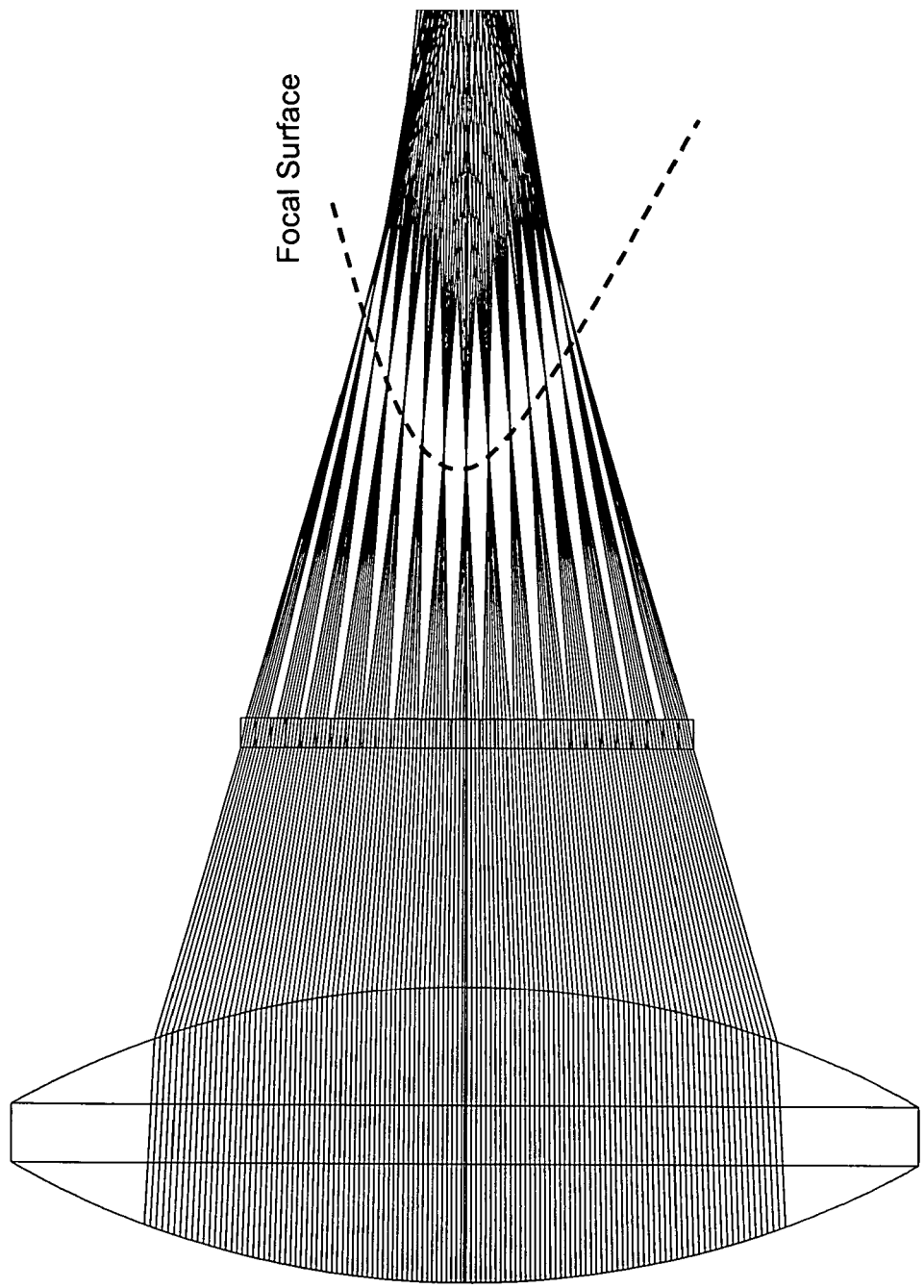

Of course, as stated previously, any number of lenslet array configurations are available. FIG. 6 shows a profile of a uniform array of lenslets similar to FIG. 1 where the lenslet elements have the same optical power. Thus, the focal surface is arced back toward the array. FIG. 7 shows a converse focal length dispersion from FIG. 6, showing how the zonal lenslet array of the present invention can be configured to create a conical focal surface arced away from the array.

Figure 8:
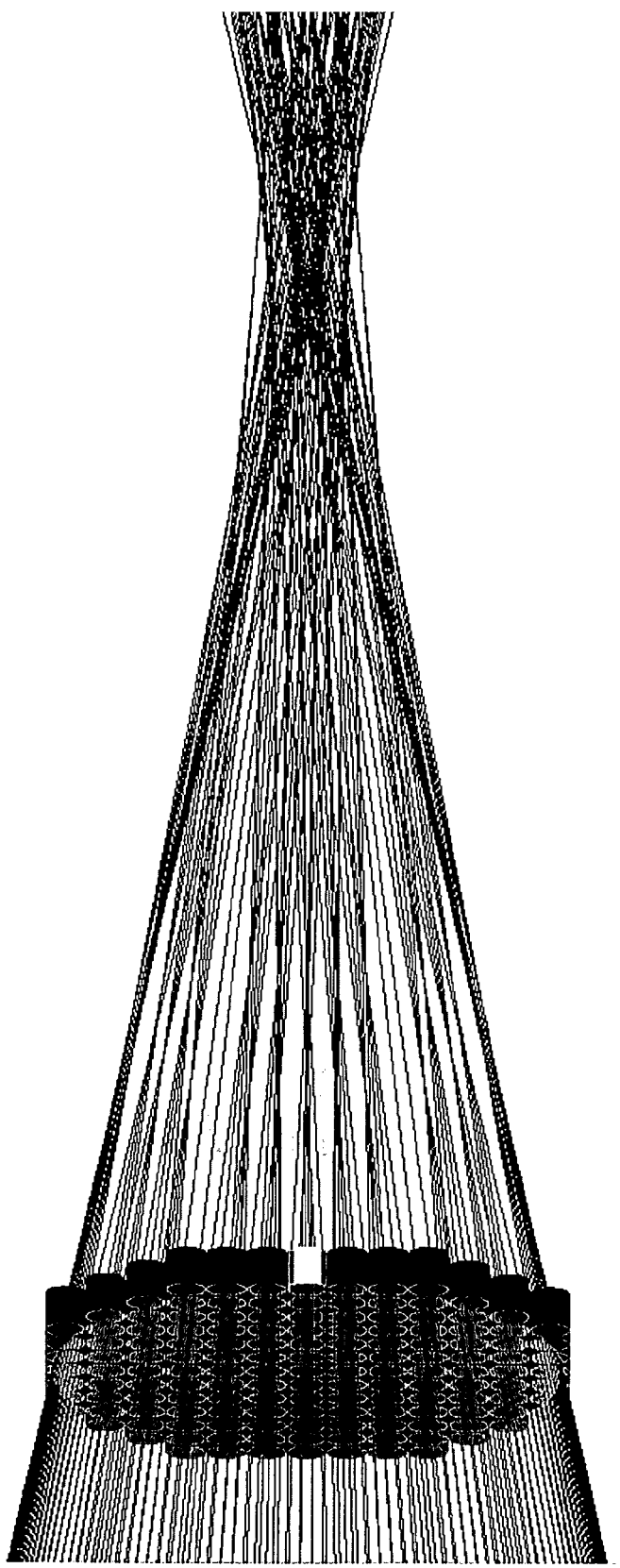
FIG. 8 is a three-dimensional view of the zonal lenslet array according to the present invention.
Figure 9:
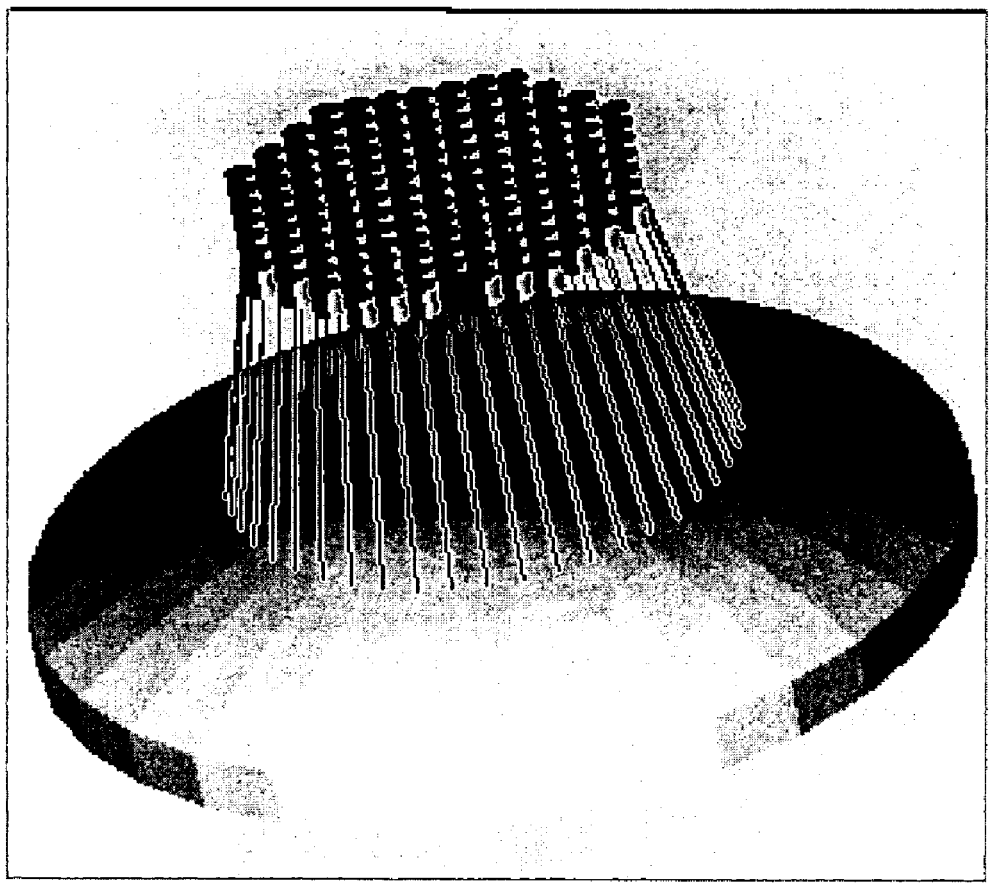
FIG. 9 is another three-dimensional view of the present invention showing the master lens focus the input laser signal onto the zonal lenslet array.

Because those skilled in the art will have to accommodate three dimensions in any design according to the present invention, FIG. 8 shows a three-dimensional view of the zonal lenslet array with rotation symmetry according to the present invention. This configuration is the same as shown in cross-section in FIG. 6. FIG. 9 is another three-dimensional view of the present invention showing the master lens focus the input laser signal onto the zonal lenslet array. This is critical if a master lens is used because the focus of the master lens will have to be accounted for in the design.

Figure 10:
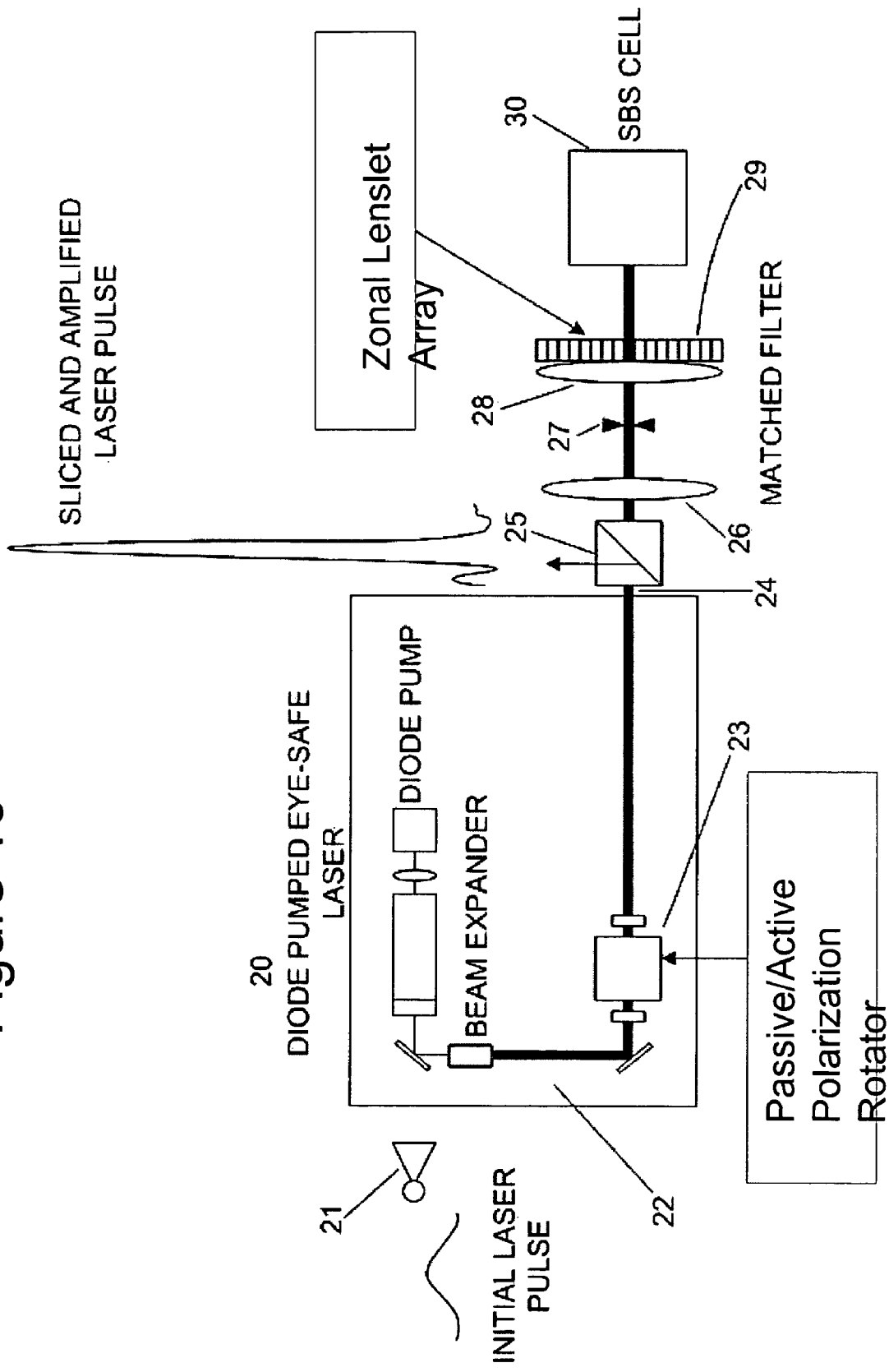
FIG. 10 is a schematic representation of the laser system in which the present invention may be useful.

As stated previously, the present invention would be particularly useful as a component in stimulated Brillouin scattering (SBS) short wave laser configuration. Such a configuration is shown in FIG. 10. As shown, a SBS laser cell configuration comprises a shaping lens on an axis circular aperture followed by a higher power and a condensing lens followed by a zonal lenslet array according the present invention. Also shown in FIG. 10 is a beam expander 22 and a passive method for extracting the traveling laser pulse from the system.

A diode pumped eye-safe laser 2 produces an energy at the focus that is above the air breakdown threshold. An initial laser pulse (beam) is produced via a laser source 21. The first output pulse (beam) exits the laser and is immediately expanded via beam expander 22. This is actually unnecessary for the original pulse (beam) but becomes critical for the second pulse (beam) as will be explained later. The output is then passed through a passive polarization rotator 23. The expanded beam is focused such that the energy at the focus is above the air breakdown threshold. It passes through the pinhole 24, which has a radius somewhat greater than the $1/e^2$ Gaussian radius of the incoming laser beam. The beam then leaves the spatial filter 24 and the beam passes the second lens 28 that has a shaping power greater than the first lens 26 thus causing it to have a focus inside the SBS cell 30.

This converging beam now passes through the zonal lenslet array of the present invention. This breaks the incoming wave into sections, as shown in the previous figures, each with their own unique angle, yet all coming to a common focus and hence to a common SBS acoustic grating. This is critical so that all portions of the beam remain in phase with all other portions of the wave front in their original manner. The beams are at first phase conjugated until the plasma switching takes place and the return beam is truncated. Now, each SBS phase conjugated beam section re-enters the zonal lenslet array. Those aberrated portions of the beam may either miss the appropriate lens or as a minimum enter the lens at an angle in variance with the original beam section. Since each lenslet has optical power, they also produce angular magnification, thus increasing their angular variance. Next, the total light from the beam passes through the second higher power lens 29 causing the beams to focus at the spatial filter. Primarily, the aberrated portion of the beam is separated from the original beam along with the higher spatial frequencies associated with the beam sampling aperture of the lenslet array. The "cleaned up" beam is now collimated by the first lens 26, passes back through the system as discussed in the prior art and is now de-magnified back to its original size and is now amplified. After its double pass amplification the high peak power pulse emerges from the laser and is immediately expanded to prevent damage to the up-stream optical components. The beam passes through the passive extraction section and is ejected from the laser.

Those skilled in the art will appreciate that the present invention has applications for high power laser systems as well. Given this disclosure, those skilled in the art would be able to configure many different types of laser applications using the zonal lenslet array according to the present invention. Because this system is novel, those skilled in the art would have to devise beam shaping simulators that could take into account the plurality of the foci created by the zonal lenslet array. The Zemax™ generated figures used in this specification shows that this is possible. Moreover, while the figures of the specification show relatively two dimensional zonal lenslet arrays, the arrays themselves can take any form such as cylindrical such that the zones of the array are uniform in the x-direction and changing in the y direction.

What is claimed is:

1. A laser pulse shaping device comprising:
   a laser source producing a laser pulse; and
   a zonal lenslet array, which is comprised of different lenslet elements that provide for different focal lengths so as to establish individually predetermined focal lengths of the laser pulse, said zonal lenslet array being disposed to receive said laser pulse and is formed as a three dimensional array having predetermined zones comprising the zonal lenslet array and is cylindrical such that the zones of the array are uniform in the x direction and changing in the y direction.

* * * * *